US005816593A

United States Patent [19]

Che

[11] Patent Number: 5,816,593

[45] Date of Patent: Oct. 6, 1998

[54] WALKING FRAME FOR DISABLED PERSONS

[75] Inventor: Sung Chung Che, Taichung, Taiwan

[73] Assignee: Genemax Medical Products Industry Corp., Taichung, Taiwan

[21] Appl. No.: 907,989

[22] Filed: Aug. 11, 1997

[51] Int. Cl.$^{6}$ .......... B62M 1/00

[52] U.S. Cl. .......... 280/87.041; 280/641; 280/87.021

[58] Field of Search .......... 280/87.021, 87.041, 280/39, 641, 642, 643, 651, 655, 657; D12/131

[56] References Cited

U.S. PATENT DOCUMENTS 2,220,150 11/1940 Goldman .......... 280/36
2,398,863 4/1946 Sides .......... 280/41
2,917,316 12/1959 Gill .......... 280/41
5,348,336 9/1994 Fernie et al. .......... 280/641
5,603,517 2/1997 Lorman .......... 280/5.2
5,716,063 2/1998 Doyle et al. .......... 280/87.05

*Primary Examiner*—D. Glenn Dayoan
*Assistant Examiner*—Clovia Hamilton
*Attorney, Agent, or Firm*—Harrison & Egbert

[57] ABSTRACT

A walking frame for disabled persons is provided with two hand grips of a polygonal construction. The hand grips are engaged securely with the polygonal tubes of the main legs of the walking frame in conjunction with the tightening blocks and the fastening sleeves. The hand grips are fastened such that they remain stably at the same level so as to afford the lame persons an easy and comfortable gripping. The walking frame can be folded for easy storage and shipment.

1 Claim, 9 Drawing Sheets

WALKING FRAME FOR DISABLED PERSONS

FIELD OF THE INVENTION

The present invention relates generally to a walking aid, and more particularly to a walking frame for use by a disabled person as an aid in walking.

BACKGROUND OF THE INVENTION

As shown in FIGS. 1 and 2, a prior art walking frame has two round hand grips 10, which are fastened respectively with a nut 11 and a bolt 12. The prior art walking frame further has a back rest rod 16, and two U-shaped rods 17 for bracing the bottom of the walking frame. The prior art walking frame is defective in design in that the hand grips 10 can not be held securely and easily, and that the U-shaped rods 17 take up an extra space when the walking frame is folded, as shown in FIG. 3. Another walking frame of the prior art has two round hand grips 13, which are adjustably fastened with a rotary bolt 15 engageable with a plurality of the fastening holes 14, as shown in FIG. 3. This walking frame is defective in design in that the bolt 15 must be unfastened before the hand grips 13 are adjusted in level.

SUMMARY OF THE INVENTION

It is therefore the primary objective of the present invention to provide a walking frame with two polygonal hand grips, which can be located securely to ensure secure gripping.

It is another objective of the present invention to provide a walking frame with a back rest rod, which can be detached so as to reduce the overall space occupied by the walking frame when the walking frame is folded for storage or shipment.

The foregoing objectives, features and functions of the present invention will be more readily understood upon a thoughtful deliberation of the following detailed description of an embodiment of the present invention with reference to the accompanying drawings.

DETAILED DESCRIPTION OF THE EMBODIMENT

Figure 1:
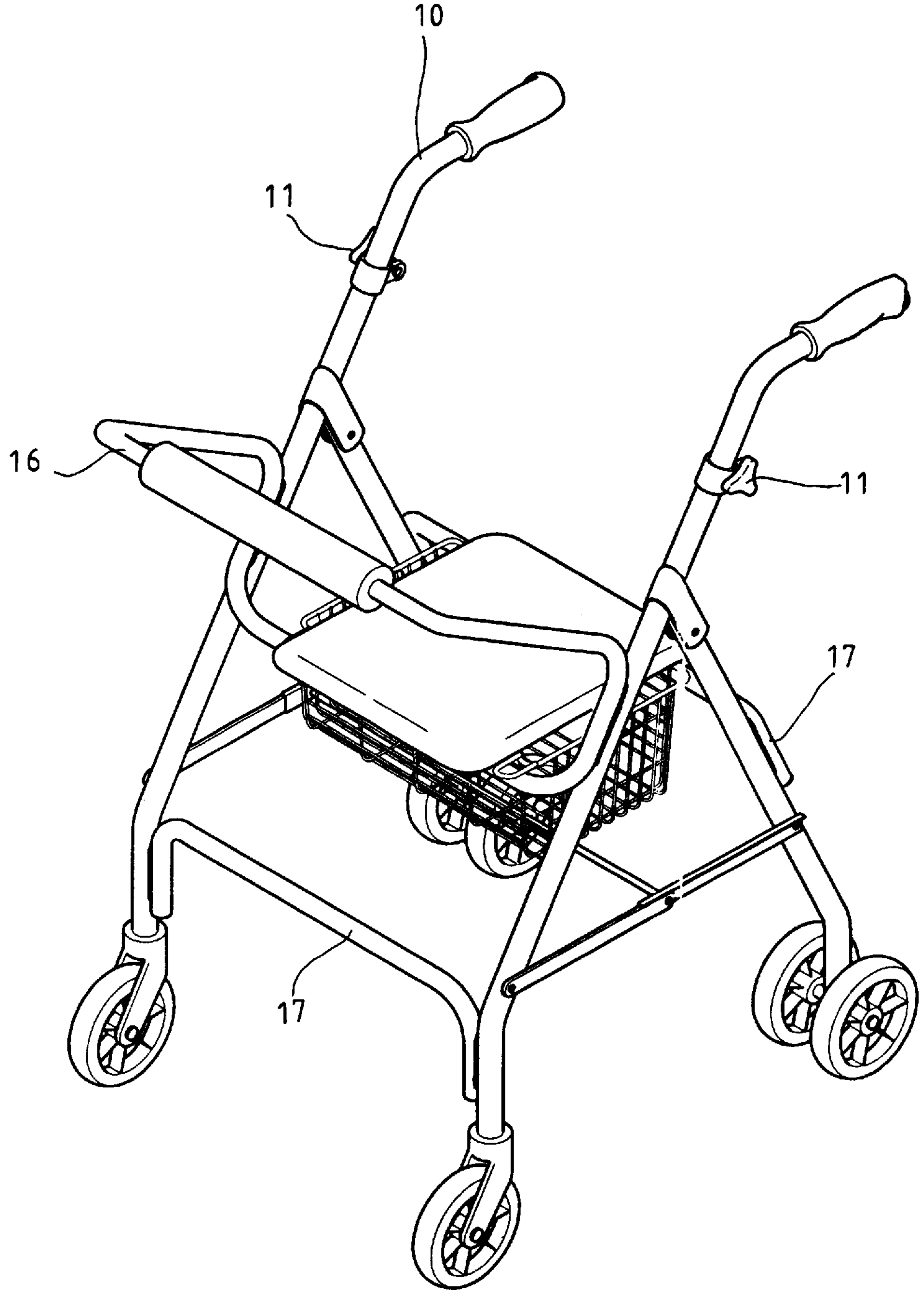
FIG.1 PRIOR ART
FIG. 1 shows a perspective view of a walking frame of the prior art.
Figure 2:
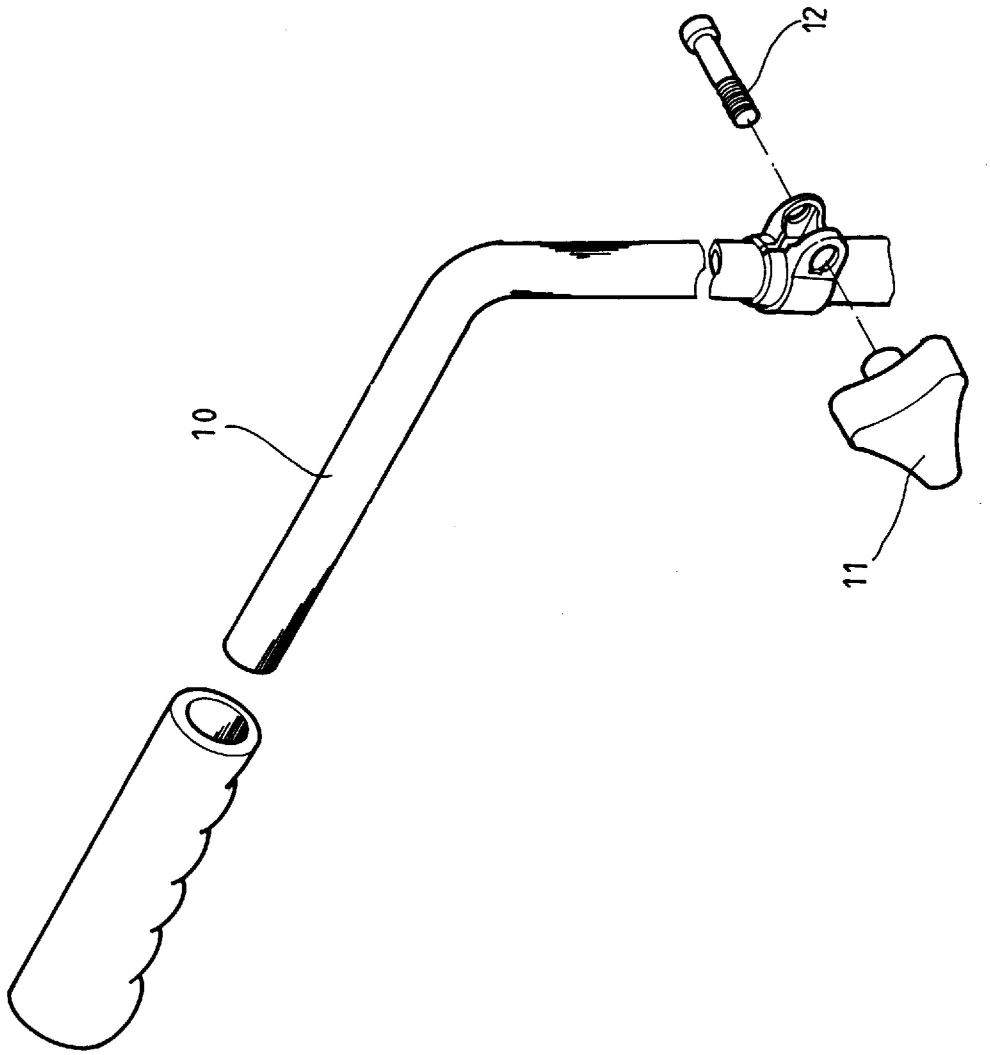
FIG.2 PRIOR ART
FIG. 2 shows an exploded view of the walking frame of the prior art.
Figure 3:
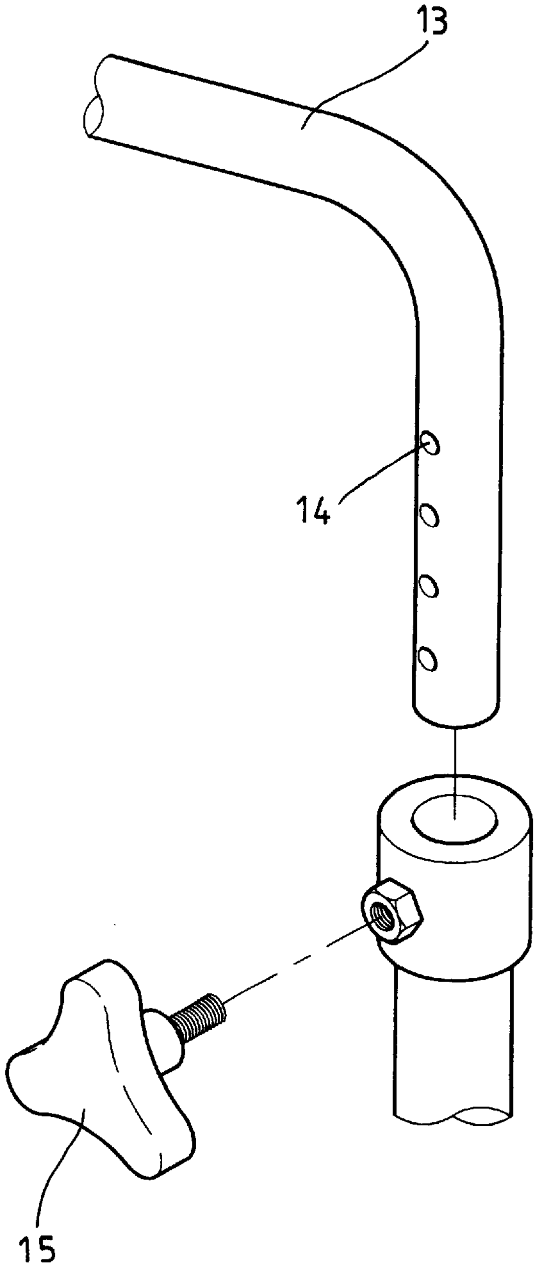
FIG.3 PRIOR ART
FIG. 3 shows an exploded view of another walking frame of the prior art.
Figure 4:
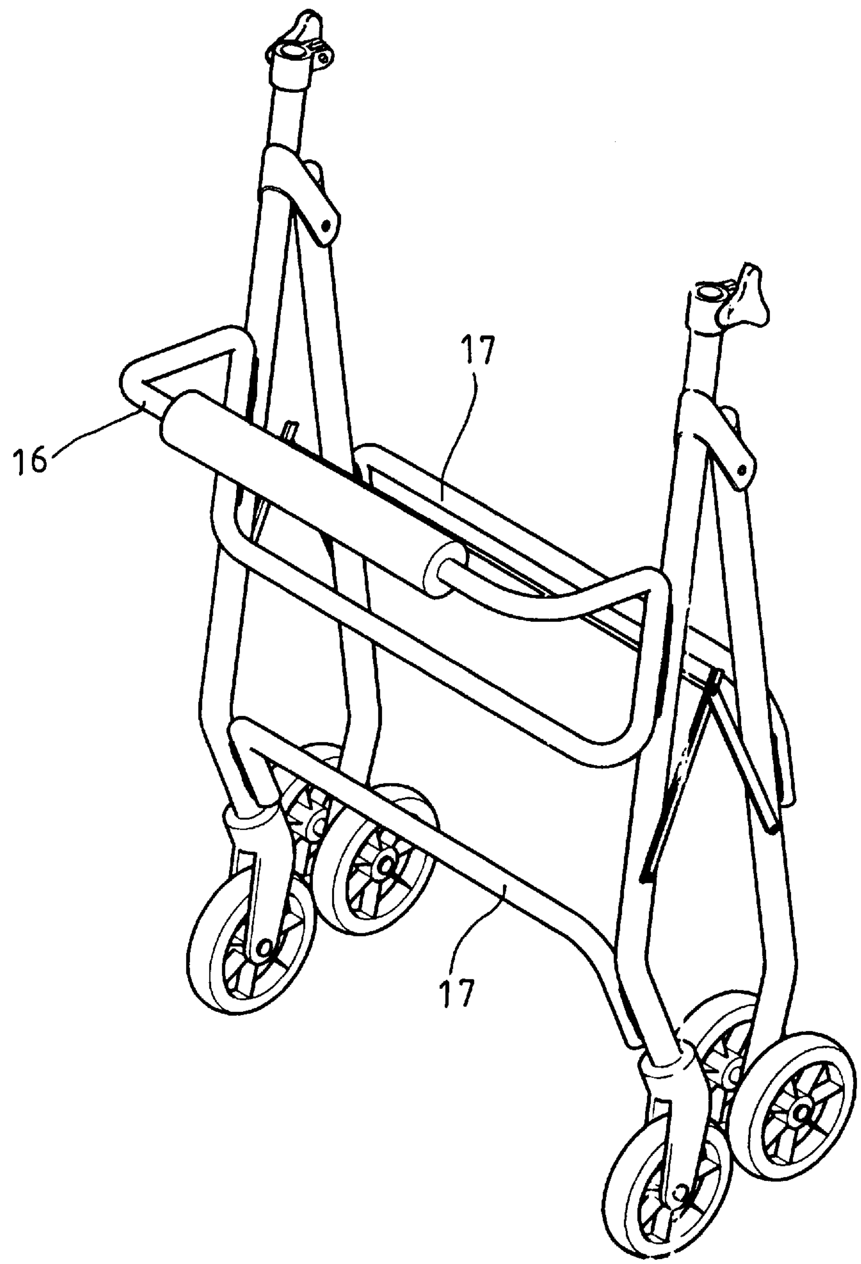
FIG.4 PRIOR ART
FIG. 4 shows a perspective view of the folded prior art walking frame.
Figure 5:
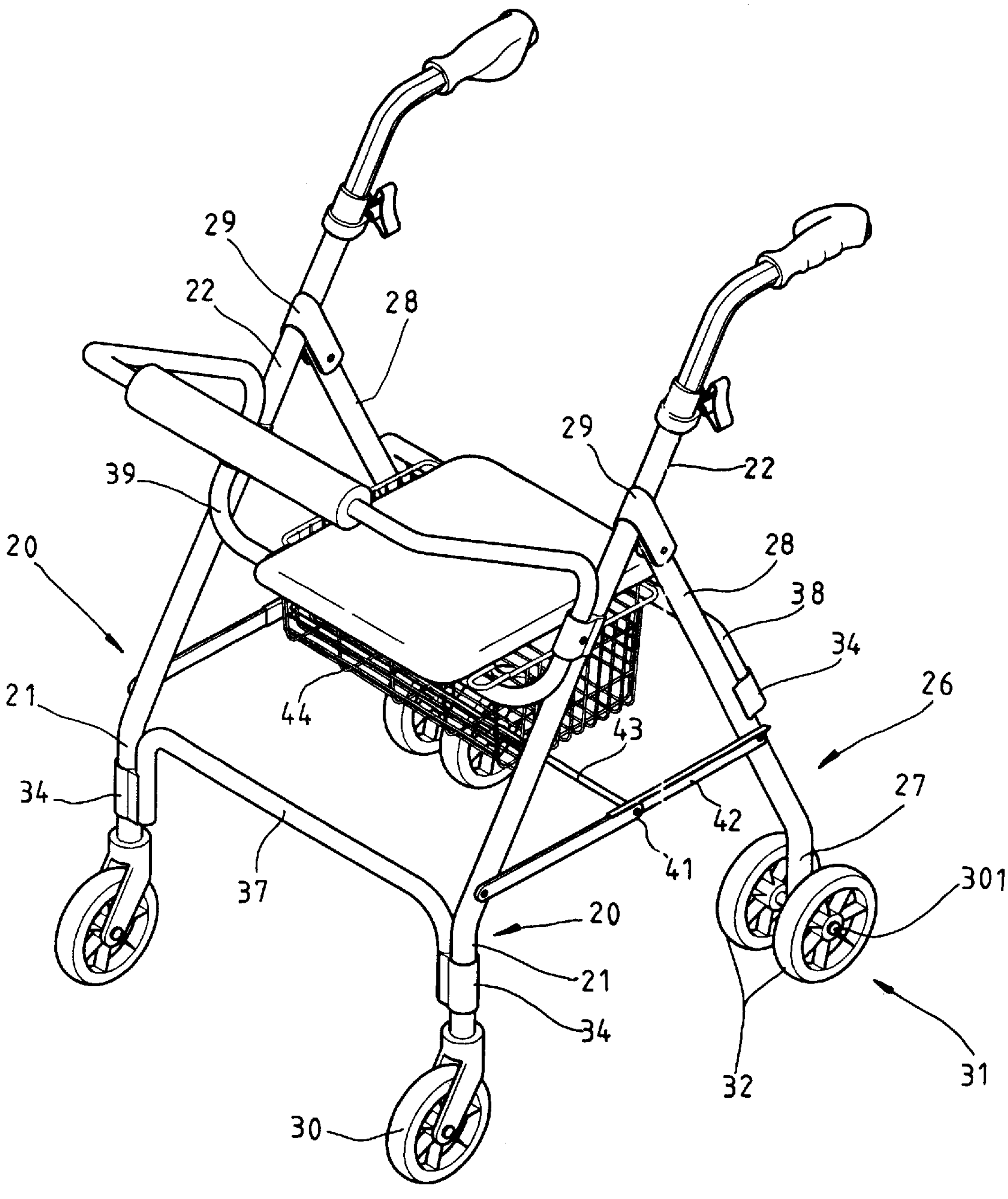
FIG. 5 shows a perspective view of a walking frame embodied in the present invention.
Figure 6:
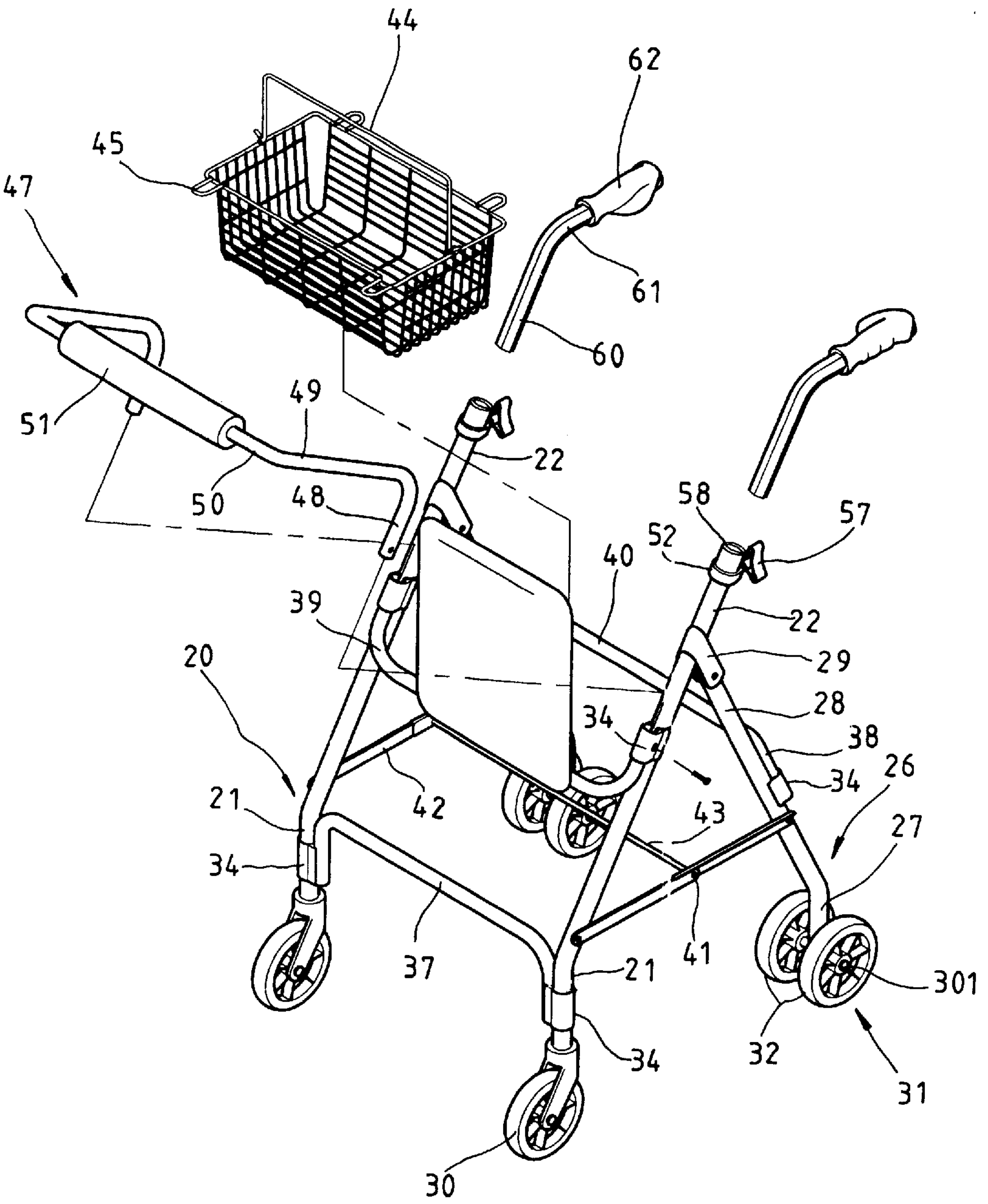
FIG. 6 shows an exploded view of the walking frame of the present invention.
Figure 7:
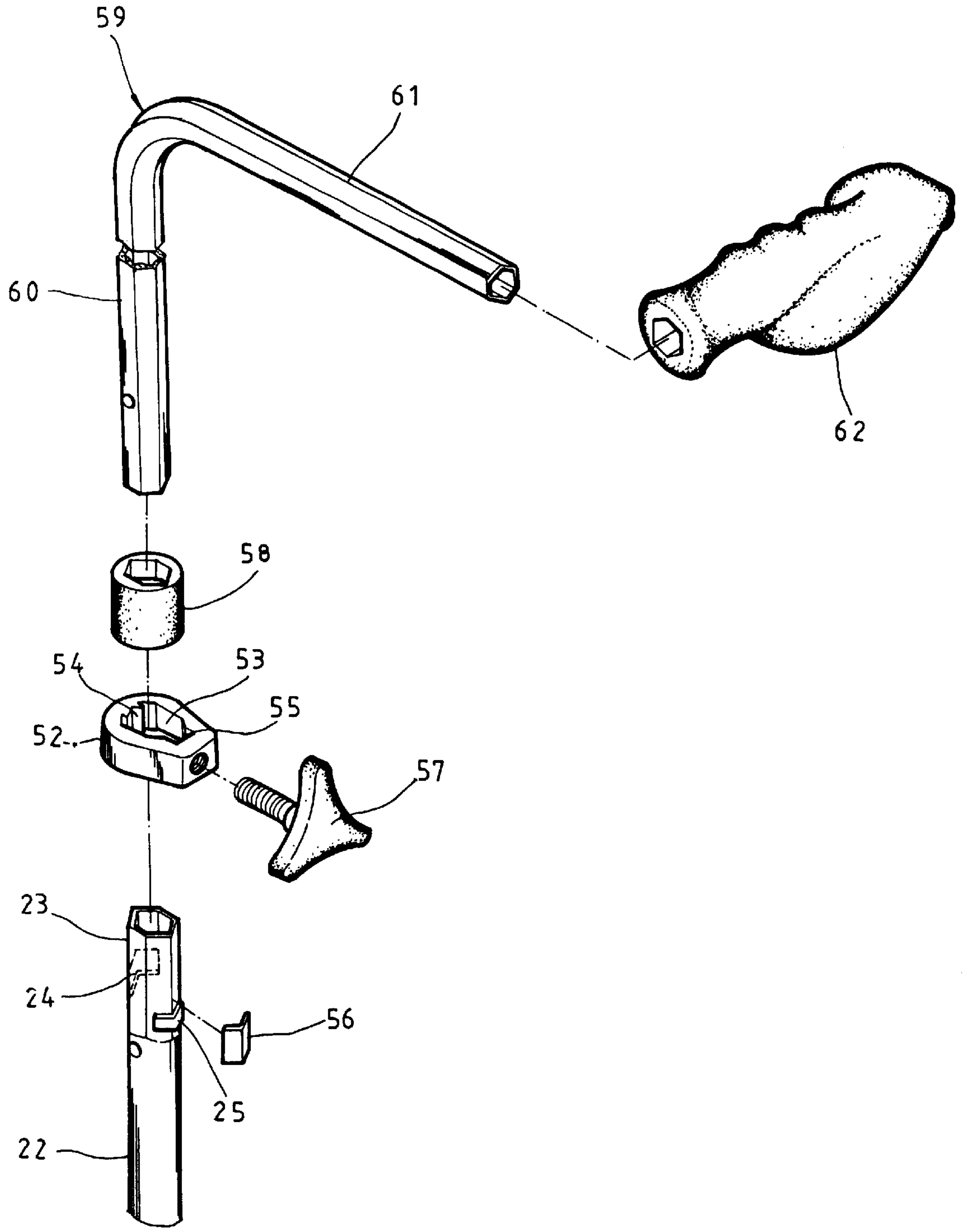
FIG. 7 shows an exploded view of the hand grip and the main leg of the present invention.
Figure 8:
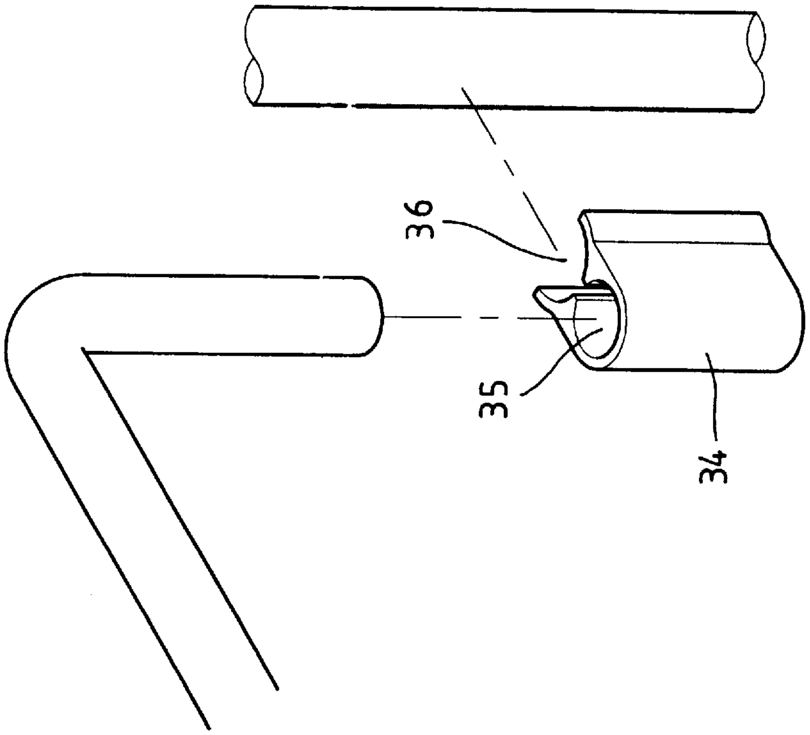
FIG. 8 shows an exploded view of the fastening sleeve and the U-shaped rod of the present invention.
Figure 9:
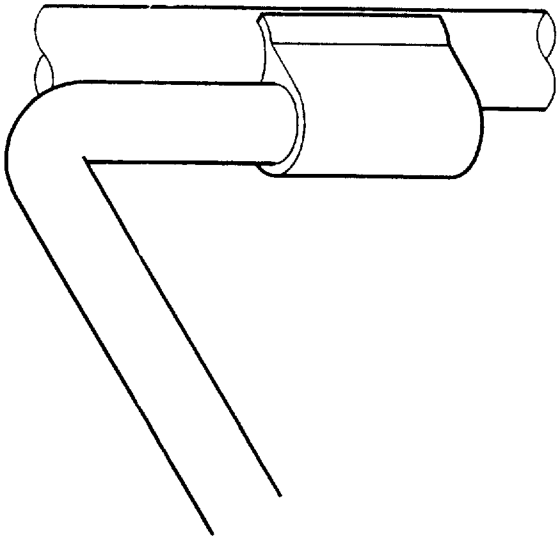
FIG. 9 shows a perspective view of the fastening sleeve in combination with the U-shaped rod of the present invention.
Figure 10:
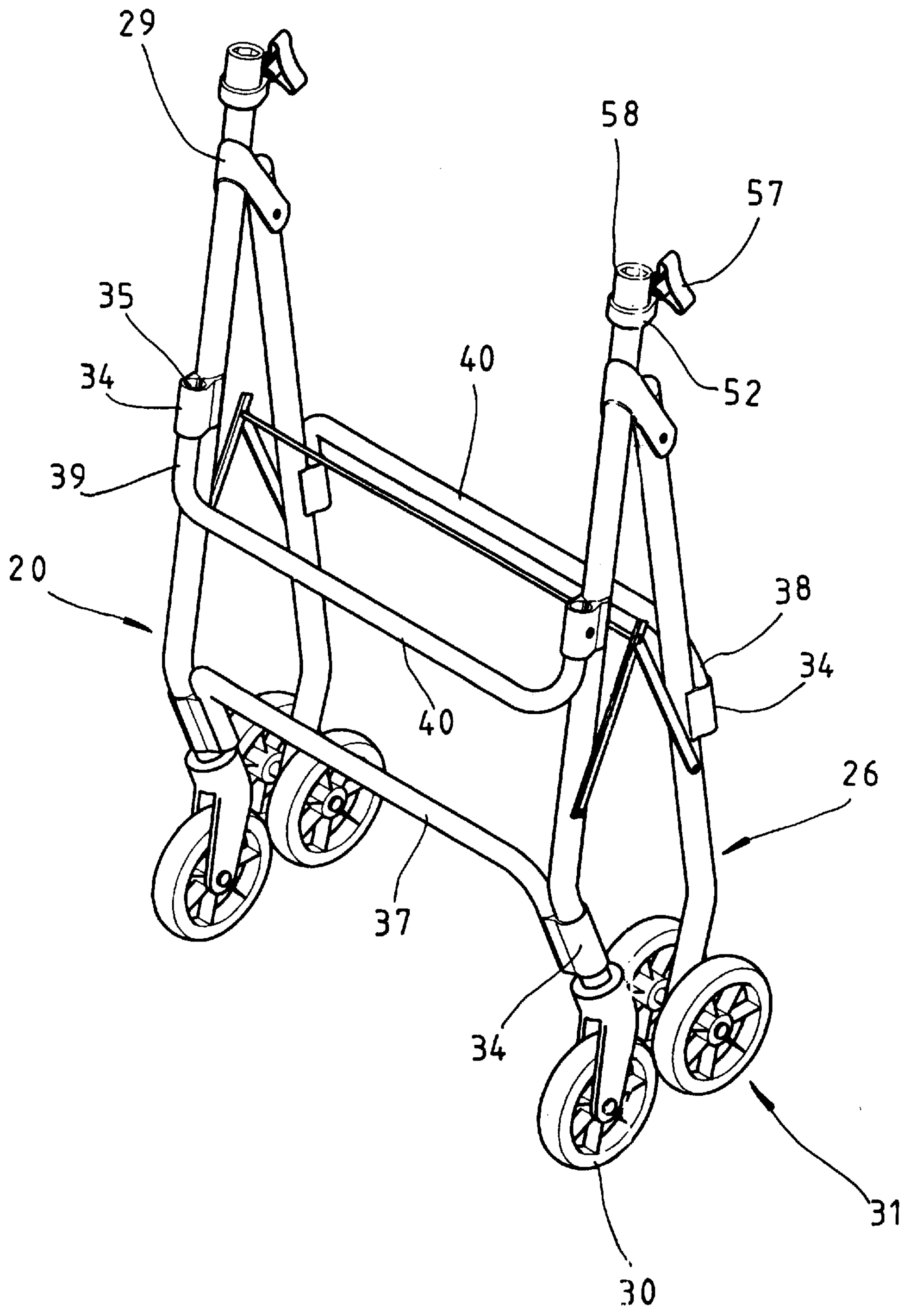
FIG. 10 shows a perspective view of the present invention in the folded state.

As shown in FIGS. 5–10, a walking frame embodied in the present invention is composed of the component parts, which are described explicitly hereinafter.

Two main legs 20 are provided with a longitudinal rod 21, and a slanted rod 22 having a polygonal tube 23 with a long hole 24 and a protruded block 25.

Two support legs 26 are provided with an upright rod 27 and a slanted rod 28 which is fastened pivotally with the slanted rod 22 of the main legs 20 by means of an U-shaped body 29.

Two movable castors 30 are fastened pivotally with the longitudinal rod 21 of the main legs 20 such that the castors 30 are capable of a 360° rotation.

A plurality of pushing wheels 31 are mounted on the upright rod 27 of the support legs 26. The pushing wheels 31 are provided with a wheel body 32, which is fastened by a bolt 301.

A plurality of fastening sleeves 34 are provided with a round hole 35 and a semicircular slot 36 for fastening the longitudinal rod 21 and the slanted rods 22 and 28.

Three U-shaped rods 37, 38 and 39 are fastened with the main legs 20 and the support rods 26.

A folding frame 41 is provided with two foldable pivot rods 42, which are fastened pivotally with the main legs 20 and the support legs 26. The pivot rods 42 are provided with a bracing rod 43.

An article-holding basket 44 is provided with two lugs 45 for fastening the basket 44 with the cross rods 40 of the U-shaped rods 38 and 39.

A seat 46 is fastened with the cross rods 40 of the U-shaped rods 37 and 39.

A backrest rod 47 has a straight rod 48, which is fastened with the main legs 20 and is provided with a slanted rod 49 and a rest rod 50. The rest rod 50 is covered with a soft pad 51.

The two tightening blocks 52 are provided with a polygonal hole 53 having a protruded block 54 and a recess 55 in which a press piece 56 is located. The polygonal holes 53 are engaged with the polygonal tubes 23 of the main legs 20. The press piece 56 is in contact with a rotary knob 57.

The two fixing sleeves 58 are fitted over the polygonal tubes 23 of the main legs 20.

The two hand grips 59 have a straight rod 60, which is engaged with the polygonal tube 23 such that the rotary knob 57 is in contact with the press piece 56. The rotary button 57 has a threaded rod 571 capable of pulling the tightening blocks 52 to displace towards the rotary knob 57 in such a manner that the straight rod 60 of the hand grips 59 is urged by the protruded block 54, thereby enabling the two hand grips 59 to remain at the same level for easy and comfortable gripping. The cross rod 61 of the hand grips 59 is provided with a covering 62.

The embodiment of the present invention described above is to be deemed in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A walking frame for use as an aid in walking, said walking frame comprising:

two main legs provided with a longitudinal rod and a slanted rod having a polygonal tube with a long hole and a protruded block;

two support legs provided with an upright rod and a slanted rod which is fastened pivotally with the slanted rod of the main legs;

two movable castors fastened respectively and pivotally with the longitudinal rod of said main legs such that said castors are capable of 360-degree rotation;

a plurality of pushing wheels mounted on the upright rods of the support legs;

a plurality of fastening sleeves for fastening said longitudinal rods of said main legs and said slanted rods of said support legs;

three U-shaped rods fastened with said main legs and said support legs, each of said three U-shaped rods having a cross rod;

a folding frame provided with two foldable rods and a bracing rod for holding the foldable rods which are fastened pivotally with the main legs and the support legs;

an article-holding basket fastened with the cross rods of two of the U-shaped rods;

a seat fastened with the cross rods of two of the U-shaped rods;

a backrest rod provided with a straight rod, a slanted rod and a rest rod covered with a pad, said backrest rod fastened with said main legs;

two tightening blocks provided with a polygonal hole which is engaged with said polygonal tube of the main legs, said tightening blocks further provided with a protruded block, a recess, and a press piece located in said recess such that said press piece is in contact with a rotary knob;

two fixing sleeves fitted over the polygonal tubes of the main legs; and two hand grips provided with a straight rod which is engaged with said polygonal tube of said main legs such that said rotary knob is in contact with said press piece, and that said straight rod is urged by said protruded block of said tightening blocks so as to enable said hand grips to remain at the same level for easy and comfortable gripping.

* * * * *